US007123993B1

(12) United States Patent
Freeman et al.

(10) Patent No.: US 7,123,993 B1
(45) Date of Patent: Oct. 17, 2006

(54) IRRIGATION CONTROLLER

(76) Inventors: Aaron Lloyd Freeman, 178 Maple Dunes Ct., Wichita, KS (US) 67235; Michael Goerner Freeman, 2116 N. McComas St., Wichita, KS (US) 67203

( * ) Notice: Subject to any disclaimer, the term of this patent is extended or adjusted under 35 U.S.C. 154(b) by 32 days.

(21) Appl. No.: 10/650,631

(22) Filed: Aug. 28, 2003

Related U.S. Application Data

(60) Provisional application No. 60/407,513, filed on Aug. 28, 2002.

(51) Int. Cl.
*G05D 7/00* (2006.01)
(52) U.S. Cl. .......................... 700/284; 239/63; 239/69; 709/203; 709/219
(58) Field of Classification Search ............... 700/283, 700/284, 241, 19, 65; 239/63, 64, 69, 723; 340/286.01, 540; 709/203, 219; 702/188
See application file for complete search history.

(56) References Cited

U.S. PATENT DOCUMENTS

| | | | |
|---|---|---|---|
| 6,314,340 B1 * | 11/2001 | Mecham et al. ............ | 700/284 |
| 6,437,692 B1 * | 8/2002 | Petite et al. ................ | 340/540 |
| 6,459,959 B1 * | 10/2002 | Williams et al. ........... | 700/284 |
| 6,675,098 B1 * | 1/2004 | Peek et al. .................. | 702/3 |
| 2001/0034754 A1 * | 10/2001 | Elwahab et al. ........... | 709/201 |
| 2002/0002425 A1 * | 1/2002 | Dossey et al. .............. | 700/284 |
| 2002/0082748 A1 * | 6/2002 | Enga et al. ................. | 700/286 |
| 2002/0125998 A1 * | 9/2002 | Petite et al. ............ | 340/286.01 |
| 2003/0093159 A1 | 5/2003 | Sieminski | |
| 2003/0126295 A1 * | 7/2003 | Doherty ...................... | 709/249 |
| 2003/0182022 A1 * | 9/2003 | Addink et al. .............. | 700/284 |

OTHER PUBLICATIONS

Lance Fung, Development and Test of Sensor-Aided Microcontroller Based Irrigation System with Web Browser Interface, Oct. 25, 2002, Curtin University.*

* cited by examiner

*Primary Examiner*—Albert W. Paladini
*Assistant Examiner*—Charles Kasenge
(74) *Attorney, Agent, or Firm*—Robert O. Blinn

(57) ABSTRACT

The irrigation controller is for directing the times and duration of the flow of water to a set of irrigation zones within an irrigation system in accordance with irrigation program and schedule data. The irrigation controller includes a microprocessor and a memory which are programmed with an embedded Web server. The embedded Web server can send and receive irrigation program and schedule data in the hypertext mark-up language (HTML) format. The irrigation controller communicates HTML formatted program and schedule data through an on-board Ethernet chipset to a local area network (LAN). Accordingly, irrigation controller program and schedule data may be interactively accessed from any network accessing device having a standard Web browser which is connected to the LAN, such as for example a personal computer with a Web browser connected to the LAN. Moreover, if the LAN is connected to the Internet, the program and schedule data may be viewed or changed from a web accessing device connected to the Internet.

15 Claims, 10 Drawing Sheets

FIG. 5B

IRRIGATION CONTROLLER

CROSS REFERENCES TO RELATED APPLICATIONS

This application claims the benefit of U.S. Provisional Patent Application No. 60/407,513 filed Aug. 28, 2002.

FIELD OF THE INVENTION

This invention relates to an irrigation controller.

BACKGROUND OF THE INVENTION

Irrigation controllers are used to control the scheduling and duration of the flow of water to irrigation devices such as sprinkler heads. Sprinkler heads are typically grouped in zones which are supplied by valves which are in turn controlled by an irrigation controller. Typically, irrigation controllers include a clock, a programmable microprocessor or other type of timing device and an input device that allows the user to change the scheduling and duration of the operation of the various zones within the system. Some present irrigation controllers are designed for computer access. However, computers that interface with present systems must have specialized software or specialized hardware and software for receiving and interpreting program and schedule data from an irrigation controller.

The need for specialized software or specialized hardware and software presents problems when attempting to program or reprogram an irrigation controller from a computer. The computer must first be outfitted with the specialized software or specialized hardware and software before it can be used to program or reprogram existing irrigation controllers. This increases the expense and difficulty of establishing a remote contact with an irrigation controller—especially when the user is borrowing or using a computer he or she does not own.

BRIEF DESCRIPTION OF THE INVENTION

In an embodiment of the present invention the aforementioned problems are addressed by providing an irrigation controller having an embedded Web server, an onboard Ethernet chipset, and the use of hypertext mark-up language (HTML) for communication and control such that irrigation program and schedule data may be interactively accessed from any interconnected computer having a standard Web browser. The irrigation control system is for directing the times and duration of the flow of water to a set of irrigation zones within an irrigation system. The irrigation control system includes an irrigation controller having a first interface, a second interface and a third interface. The first interface is for receiving data from a rain gauge and/or other weather sensors which are in close proximity to the irrigation zones. The second interface is for connecting the irrigation controller to a network such as a local area network (LAN). The third interface is for sending control signals to a pump or master valve and to the various valves which control the flow of water into the irrigation zones of the system. The irrigation controller includes a microprocessor and a memory for storing irrigation program data and schedule data used for governing the start time and duration of the flow of water to irrigation zones within the irrigation system. The irrigation controller is also programmed with an embedded Web server for formatting the irrigation program and schedule data in a HTML suitable format for interactive access by a standard Web browser.

The irrigation controller also includes an Ethernet chipset which is an Ethernet connection device that connects between the microprocessor and the second interface which is in turn connected to a local area network. The Ethernet chipset allows the microprocessor to communicate through the LAN using a standard protocol. Accordingly, because the microprocessor is connected to the LAN via the Ethernet chipset and the second interface, the program and schedule data may be viewed or changed from a LAN connected computer having a standard Web browser. Moreover, if the LAN is further connected to the Internet through a device providing a continuous connection, the program and schedule data may be viewed or changed from any computer or even any Internet accessing device having HTML capability such as a personal computer, a personal digital assistant (PDA), a cellular telephone having a standard Web browser or even a file server.

BRIEF DESCRIPTION OF THE DRAWINGS

FIG. 5B is an example program and schedule form of the embedded Web server.

DETAILED DESCRIPTION

Figure 1:
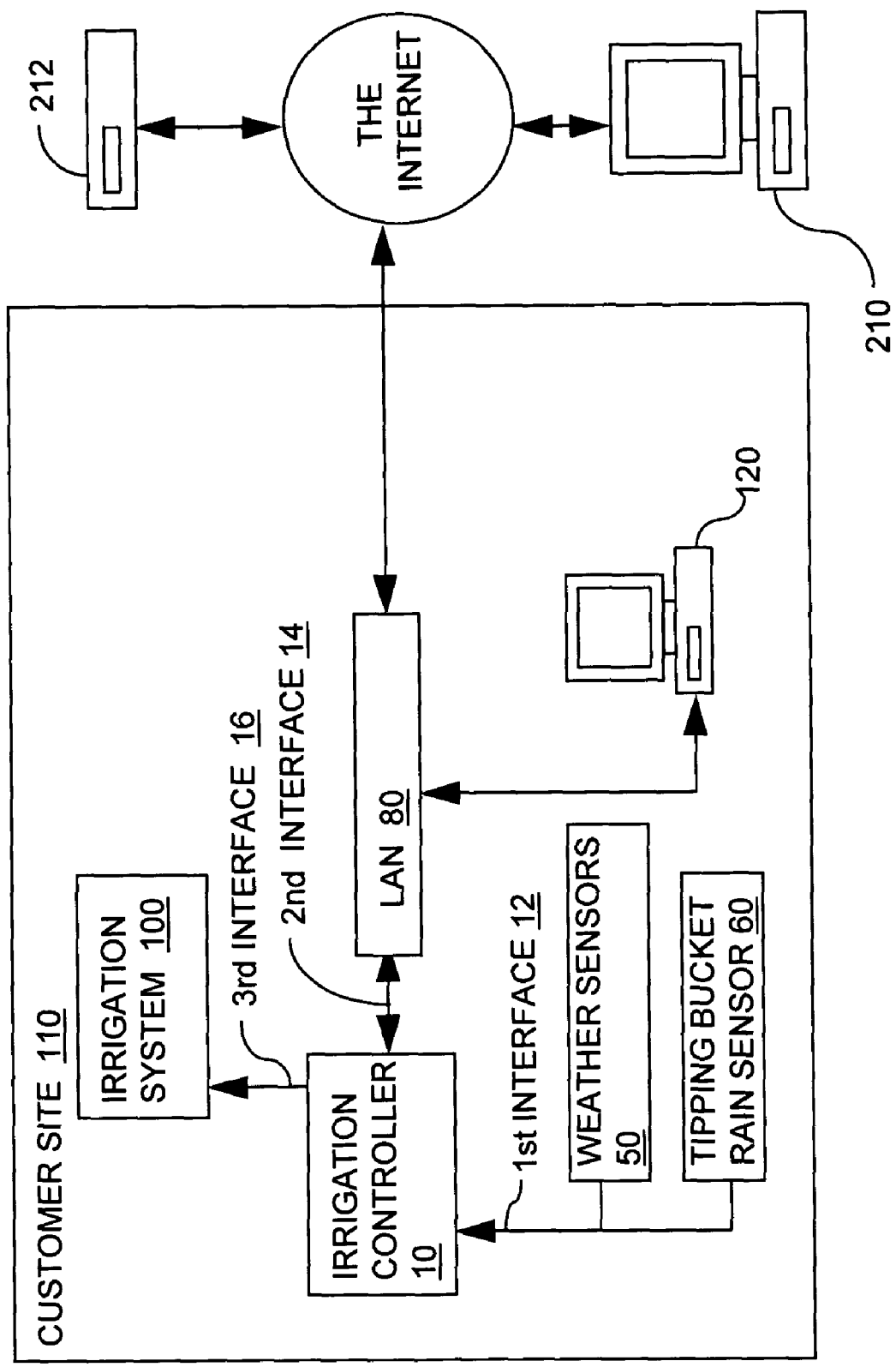
FIG. 1 is a block diagram of an irrigation control system in combination with an irrigation system and a local area network (LAN).

Turning now to the drawings, wherein like reference numerals identify identical or corresponding elements, and more particularly to FIG. 1 thereof, an irrigation controller 10 is shown connected to: weather sensors 50 and tipping bucket rain sensor 60 via a first interface 12, a local area network (LAN) 80 via a second interface 14, and an irrigation system 100 through a third interface 16. Irrigation system 100 would typically include a pump or a master valve for establishing or controlling the flow of water to the system, valves for controlling the flow of water to distinct irrigation zone and sets of irrigation devices within each zone such as sprinkler heads for distributing water within the zone. Connected to LAN 80 is a network accessing device 120 which is illustrated in FIG. 1 as a personal computer. Network accessing device 120 has a standard Web browser such as Microsoft Internet Explorer or Netsacpe, for example. FIG. 1 indicates that these items are located at a customer site which should be understood as an area that is generally proximate to irrigation controller 10.

LAN 80 may be connected to the Internet and that an Internet accessing device 210 may also be connected to LAN 80 via the Internet. Internet accessing device 210 is illustrated in FIG. 1 as a personal computer, yet Internet accessing device 210 can be any device such as a personal computer, a personal digital assistant, or a cellular phone capable of supporting the operation of a Web browser. A file server 212 may also be connected to the Internet. File server 212 may be programmed to maintain weather data for irrigation controller 10 by recording tipping bucket rain gauge measurements from irrigation controller 10 and recording local temperature, humidity and wind speed data from weather service Web sites. Moreover, file server 212 may be programmed to automatically adjust the program data of irritation controller 10 to change watering cycle duration in response to changes in weather conditions. This may be done, for example, by comparing measured weather conditions against standard seasonal conditions and then adjusting the run times according to the variance from standard seasonal conditions. As will be better understood by reading the detailed description below, file server 212, like internet accessing device 210 and network accessing device 120 can communicate with controller 10 using standard HTML formats. Users interested in having a simplified system or a system that is isolated from the Internet could still operate the system from personal computer 120 without any connection between LAN 80 and the Internet.

Figure 2:
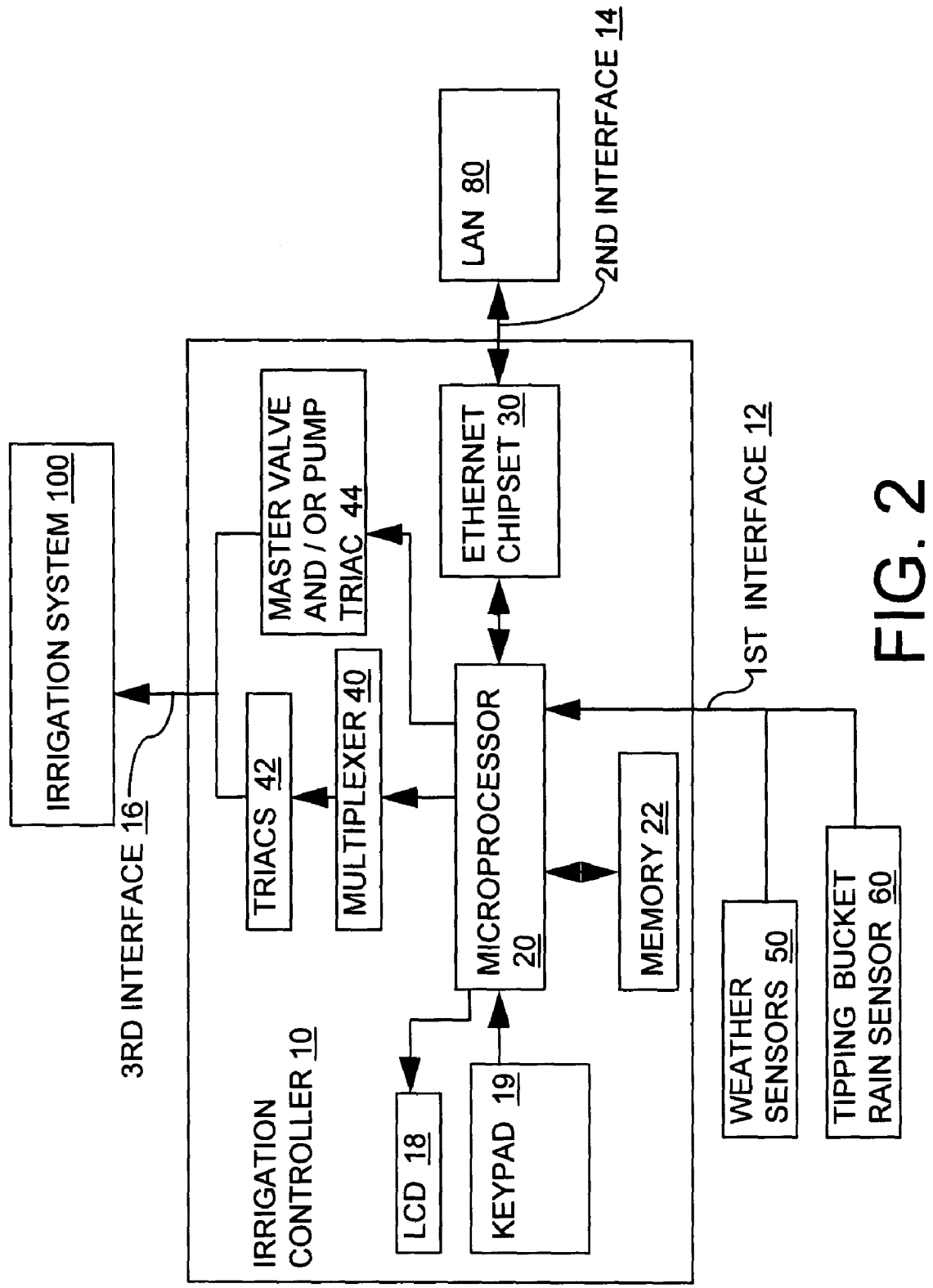
FIG. 2 is a block diagram of the irrigation controller of the present invention.

FIG. 2 provides a block diagram of irrigation controller 10. Controller 10 is connected to weather sensors 50, tipping bucket rain sensor 60, LAN 80 and irrigation system 100. Weather sensors 50 can include, for example, an anemometer, a thermometer and/or a rain detector. Generally, the purpose of weather sensors 50 is to generate stop signals for controller 10 when predetermined weather conditions exist. For example, if the wind speed is above a predetermined limit value, irrigation controller 10 may shut down irrigation system 100 because little benefit would be obtained from operating sprinkler system 100 in high wind conditions. Similarly, sprinkler system 100 should not operate when the air temperature is below freezing or during a rain shower. Tipping bucket rain sensor 60 is typically a device that measures rain fall in 0.01 inch increments. This rainfall data may be used for other purposes as will be described in greater detail below.

Irrigation controller 10 includes a microprocessor 20, an Ethernet chipset 30, a liquid crystal display (LCD) 18, a keypad 19, a multiplexer 40, a bank of triacs 42 and a master valve or pump triac 44. Weather sensors 50 and tipping bucket rain sensor 60 are located away from irrigation controller 10. FIG. 2 is primarily concerned with the flow of data and signals. Accordingly, appropriate power supplies and the connections between the power supplies and the irrigation controller components have been omitted for clarity. Those skilled in the art will readily understand that the various triac relays will typically be used to control 24V AC power, while a low voltage DC current such as 5V DC should be supplied to microprocessor 20, LCD 18, keypad 19 as well as weather sensors 50 and tipping bucket rain sensor 60.

Weather sensors 50 and tipping bucket rain sensor 60 send data signals to microprocessor 20 via first interface 12. These data signals would be better understood as pulses resulting from the closing of a 5V DC circuit. Typically weather sensors 50 would include a wind gauge or anemometer, a thermometer or a rain detector which would register a five volt signal when a predetermined high wind condition, a low temperature condition or a rain condition is detected. Tipping bucket rain sensor 60 is a device which registers a signal every time 0.01 inches of precipitation accumulates in a tipping bucket. Microprocessor 20 is programmed to maintain an ongoing count of the tipping bucket signals accumulated over a predetermined period of time. Microprocessor 20 may also be programmed to respond to weather sensors 50 and tipping bucket rain sensor 60 to alter program data such as run time values.

The operation of irrigation controller 10 is controlled by microprocessor 20. Microprocessor 20 is connected to a memory 22. Memory 22 includes a flash memory capable of maintaining data and code even when no power is provided to microprocessor 20. Since the capacity of the flash memory portion may be limited because of practical considerations, a second non-flash or RAM type memory portion may also be present. The operation of microprocessor 20 and the flash portion of memory 22 may be compared to the operation of the processor and the hard drive of a typical personal computer. Accordingly, like the hard drive of a personal computer, the flash memory portion of memory 22 maintains program and preferably at least one back up schedule and program (including start time and run time data for a back up watering cycle) as well as executable code for irrigation controller 10 even when no power is available for irrigation controller 10. The non-flash portion of memory 22 would be analogous to the Random Access Memory (RAM) of a personal computer. The non-flash portion of memory 22 may be used to store all other program and schedule data which may be too extensive to store in the flash portion of the memory. Irrigation controller 10 may be provided with back up batteries so that the likelihood of loss of power to the non-flash portion of memory 22 would be greatly reduced.

Memory 22 is loaded with an irrigation control program for controlling the operation of irrigation controller 10. The program and schedule data stored in memory 22 may be altered using keypad 19. However, program and scheduled data is preferably and more easily entered, altered or viewed using the embedded Web server capability of microprocessor 20. The irrigation control program includes a translator portion for converting data inputs and outputs between an HTML format and a format suitable for use by the irrigation control program. Memory 22 also stores and maintains an IP address which is the default display of LCD 18. The assignment of an IP address and the ability to translate, send and receive HTML formatted data gives irrigation controller 10 an embedded Web server capability.

Microprocessor 20 is connected to LAN 80 via a second interface 14 through Ethernet chipset 30 which is an Ethernet connection device. Ethernet chipset 30 translates inputs and outputs for microprocessor 20 to and from a is standard IP protocol thereby making it possible for microprocessor 20 to communicate with other devices using HTML. Because microprocessor 20 is connected to LAN 80 via second interface 14, the program and schedule data are visible to a user who is using any device having a standard Web browser which has entered the embedded Web server's IP address and which is directly or indirectly connected to LAN 80. Irrigation controller 10 may also be programmed with a standard HTML user name and password verification step so that an IP address, user name and a password are needed to interactively access program and schedule data.

Irrigation controller 10 is connected to irrigation system components 100 via a third interface 16. Irrigation system components 100 may include either a master valve or a pump as well as valves for controlling the flow of water to corresponding zones in the irrigation system. Multiplexer 40 is basically a connection which converts combinations of signals from microprocessor 20 into distinct signals that are directed to discrete relays or triacs within triacs 42. The triacs within triacs 42 use such discrete signals to control higher voltage AC currents which flow through separate lines connected to the various zone valves of irrigation system components 100. Master valve or pump triac 44 receives a "system on" signal from microprocessor 20 and responds by sending a higher voltage AC current to irrigation system components 100 sufficient to either open a master valve connected with a pressurized water system or activate a pump. Accordingly, third interface 16 would physically include a set of higher voltage AC lines connecting between the various triacs of triacs 42 and master valve or pump triac 44 and the various components of irrigation system components 100.

Figure 3:
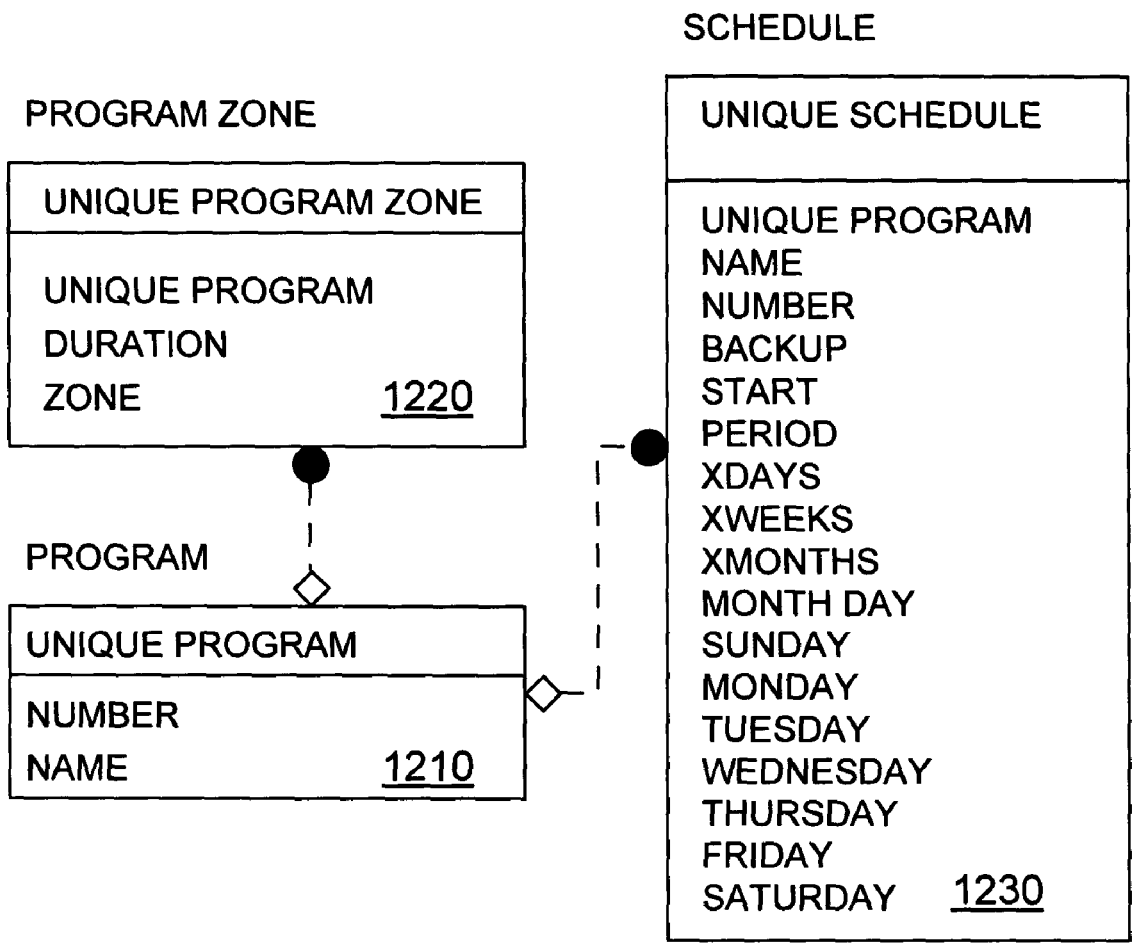
FIG. 3 illustrates the data structure for program and schedule data.

FIG. 3 illustrates a data structure 1200 for the program and schedule data maintained within memory 22. FIG. 3 indicates in block 1210 that programs must first be defined within the database by program names and program numbers. The user assigns the names while the software assigns the numbers. Block 1220 indicates that zone numbers and run times are associated with programs defined in block 1210. Although FIG. 3 only illustrates one zone number and run time, it should be understood that block 1220 is intended to represent one or more zones and one or more run times corresponding to those zones. Block 1230 presents the data structure for the scheduling of the program defined in block 1210. Although FIG. 3 only illustrates one schedule, it should be understood that block 1230 is intended to represent one or more schedules which may be used to run a program defined by blocks 1210 and 1220. So, for example, a program in which zones 1 and 2 run for 10 minutes called "Backyard 1" defined in blocks 1210 and 1220 may be associated in block 1230 with a first daily schedule called "daily schedule 1" at 7:00 AM and a second weekly schedule called "weekly schedule 1" on Mondays, Wednesdays and Fridays at 2:00 PM.

Figure 4:
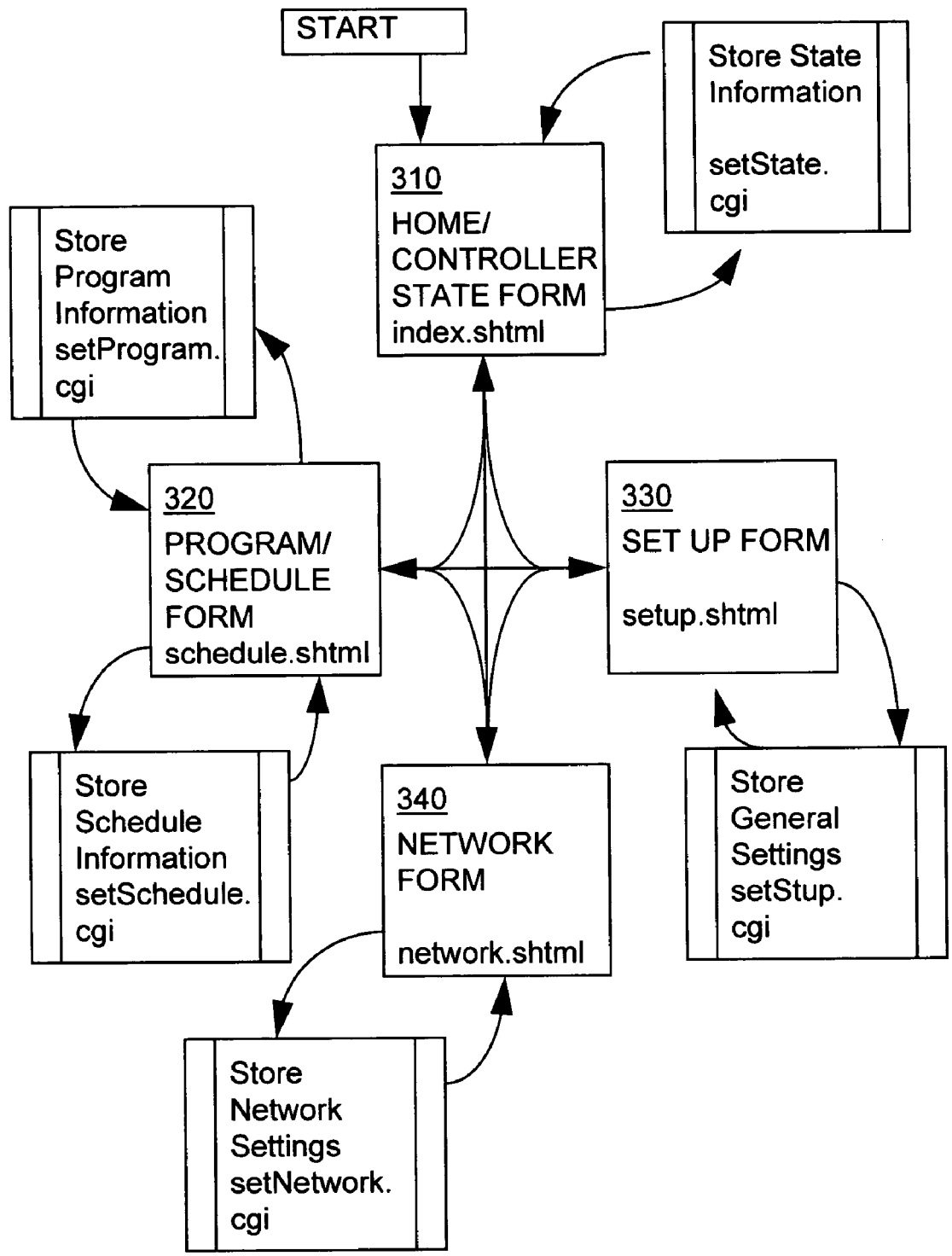
FIG. 4 is a diagram of the structure of the embedded Web server.

FIG. 4 is a diagram illustrating the structure of the Web site that is defined within the embedded Web server which is retained by the flash portion of memory 22 of irrigation controller 10. The purpose of the Web pages is to interactively present the program and schedule data of irrigation controller 10. The Web pages include a home page 310 shown in greater detail in FIG. 5A, a program and schedule page 320 shown in greater detail in FIG. 5B, a set-up page 330 shown in greater detail in FIG. 5C and a network settings page 340 shown in greater detail in FIG. 5D.

Figure 5A:
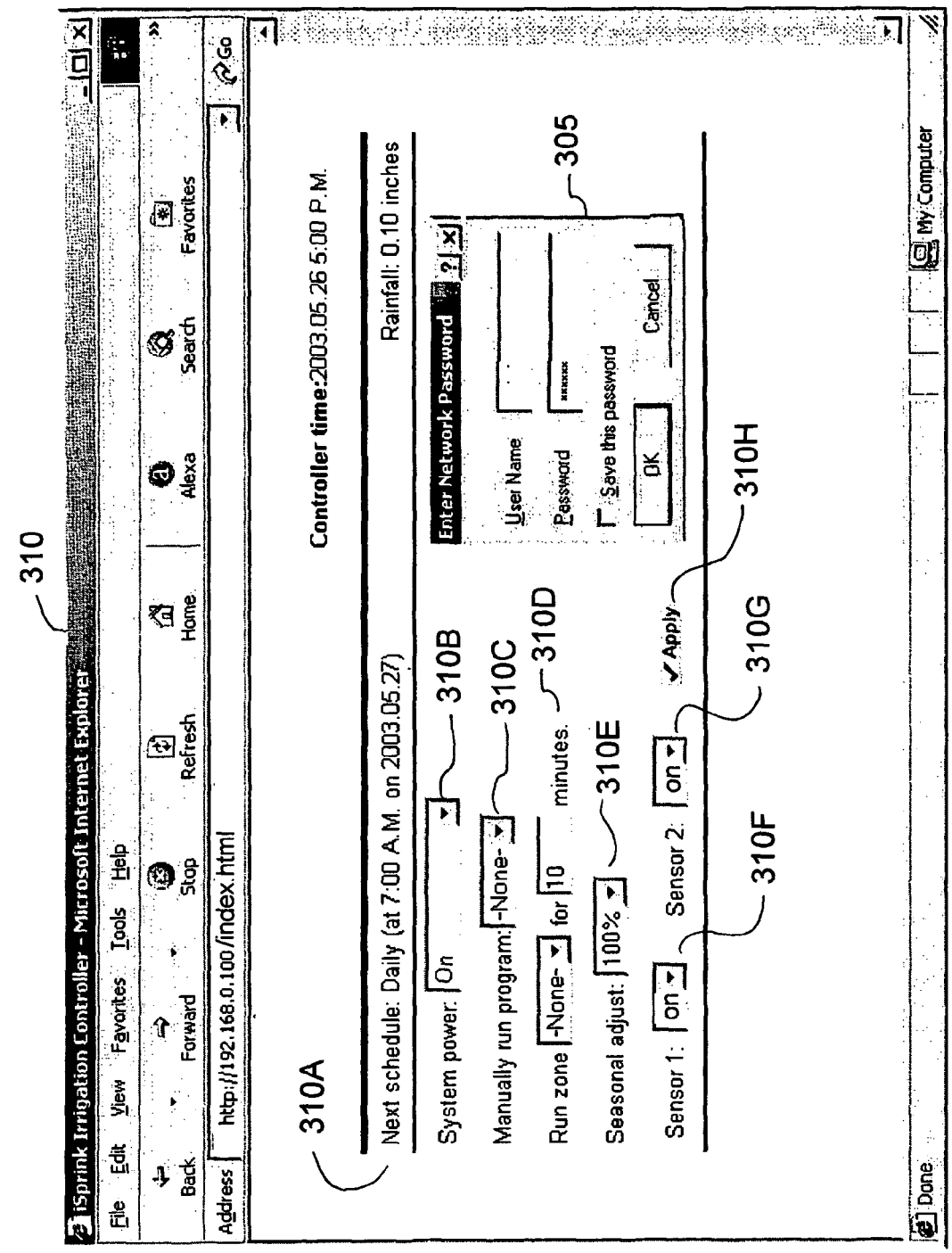
FIG. 5A is an example home page form of the embedded Web server.

The first page served by the embedded Web server upon accessing irrigation controller 10 is home page 310 shown in FIG. 5A. Prior to serving home page 310, irrigation controller 10 is programmed to request authentication and therefore a standard Web browser will respond to this request for authentication by displaying authentication dialog box 305. If the user does not respond to dialog box 305 with a valid user name and password, an error page is presented with a second blank presentation of dialog box 305. If the user responds with the correct user name and password, dialog box 305 disappears and page 310 as shown in FIG. 5A is displayed without dialog box 305. In a controller status block 310A, the user is informed of the current operating status of the irrigation controller 10. A system switch block 310B allows the user to turn the system on or off or even delay the operation of the system for a selected number of hours. In a manual run program block 31C, the user may select and run a program. Still further, in a run zone block 310D, the user may run a selected zone for a selected number of minutes. In a seasonal adjustment block 310E, the user may generally scale the schedules according to the season. During the height of summer, a 100% seasonal adjustment factor may be appropriate. During October, a 50% seasonal adjustment factor may be appropriate. In sensor blocks 310F and 310G, the user can activate or deactivate data collection form sensors 50 or tipping rain bucket sensor 60. An apply button 310H is used to transmit selections or entries from home page 310.

Figure 5B:
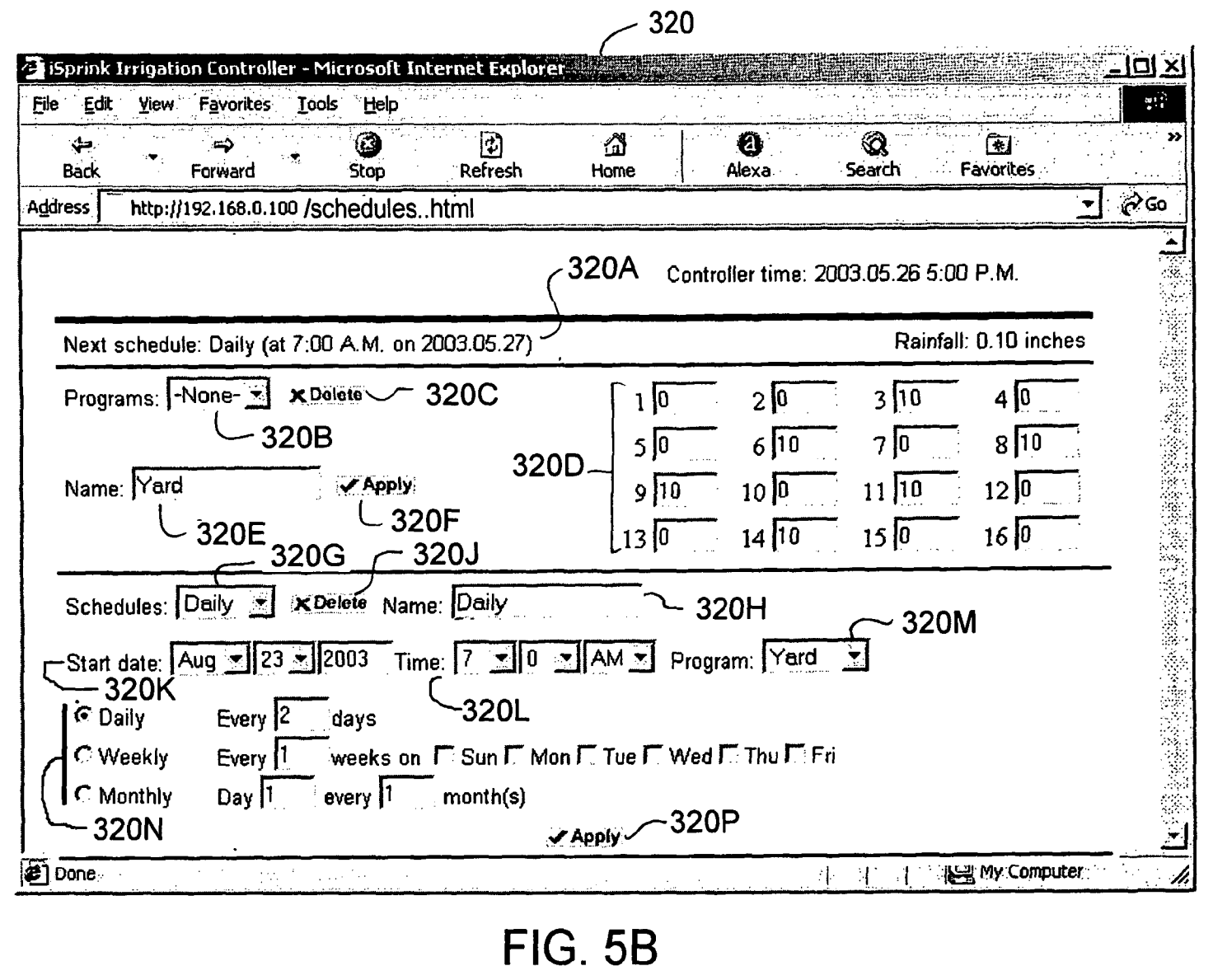

Program and schedule page 320 shown in FIG. 5B is for entering and displaying programs and schedules stored in memory 22. Program and schedule page 320 also includes a controller status block 320A for providing the current operating status of irrigation controller 10. Program and schedule page 320 is divided into a program portion and a schedule portion. In the program portion, a program selection block 320B allows the user to select a program for viewing or modification. Zone fields 320D provide the run time in minutes for each zone for the indicated program, while delete button 320C clears the values from zone fields 320D. In FIG. 5B, as indicated in program entry block 320F, a program having the program name "Yard" is being defined. Selecting apply button 320F will cause program "Yard" to be stored by irrigation controller 10.

The Schedule portion of program and schedule page 320 includes a schedule selection block 320G where a schedule may be selected for viewing or modification. A schedule name entry block 320H allows the user to define a new schedule name. A schedule deletion button 320J provides for the deletion of a selected schedule. A start date and time entry line 320K provides for the entry of a starting day and starting time for the schedule. Generally, the starting date will default to the current date. A program selection block 320M is used to select which program the schedule will be associated with. A schedule frequency field 320N allows for daily repetitions every one, two or three days, weekly repetitions on selected days or even monthly repetitions on a selected day of the month. It is important to note that when the schedule is applied with an apply button 320P, the indicated schedule is connected with the program selected in block 320N above such that the defined program will run when indicated by the associated schedule. More than one schedule may be associated with a given program. A user would define a new schedule by entering a new schedule name into schedule name entry block 320H, entering the schedule run times in fields 320L and 320M, connecting the schedule with a program using block 320M and then clicking apply button 320V. The program and schedule data entered using this page is preferably stored in the non-flash portion of memory 22.

Figure 5C:
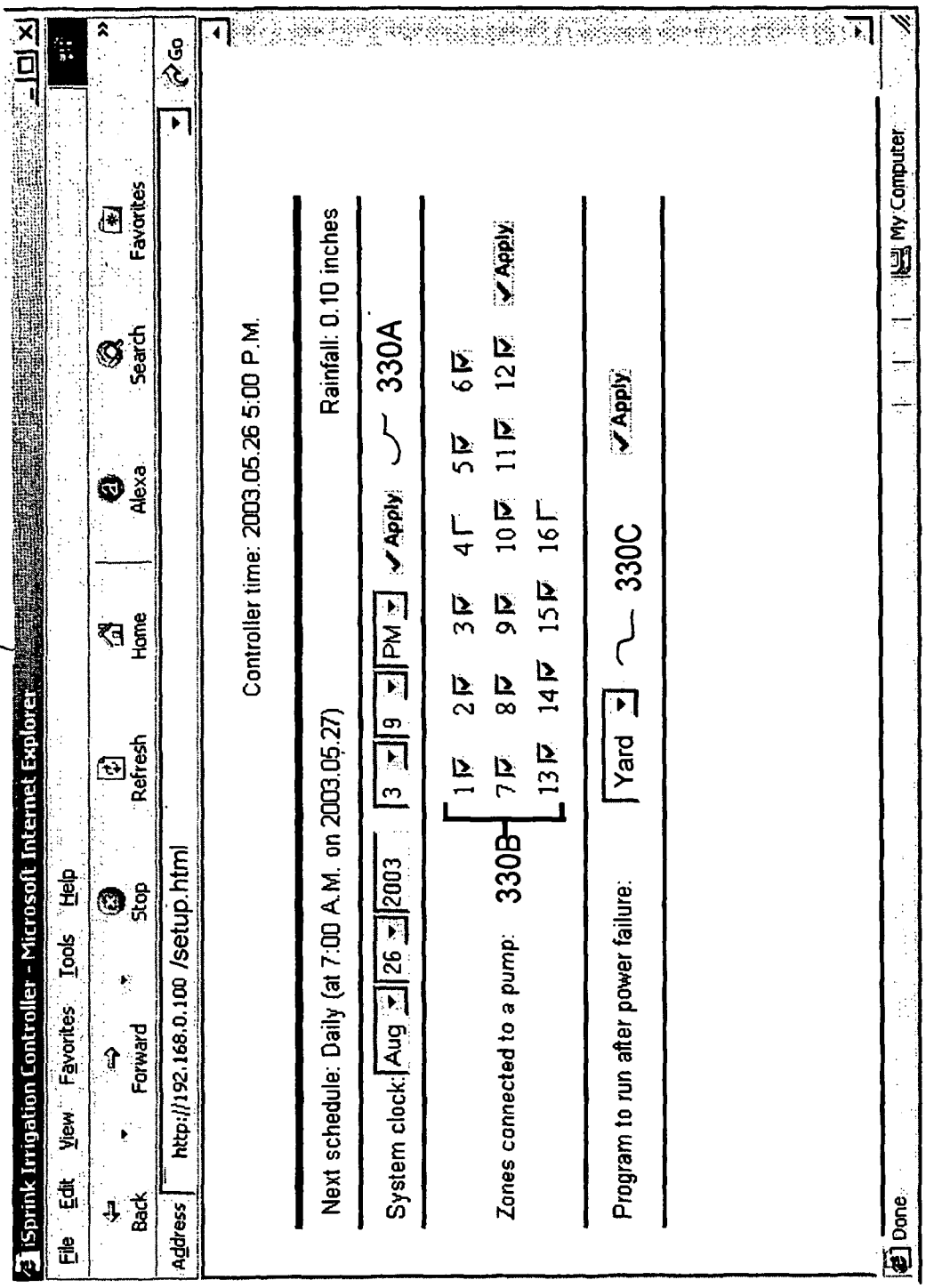
FIG. 5C is an example set up form of the embedded Web server.

Set up page 330 shown in FIG. 5C is for setting up basic operating instructions for irrigation controller 10. Set up page 330 includes a system clock field for setting the current time. In a zone field 330B, the user indicates which zones are actually connected to a pump or water supply. Because irrigation controller 10 may have limited flash memory capable of retaining data during a total power storage, a back up program box 330C is provided. The program indicated in back up program box 330C is the program which will be run according its associated schedule or schedules should a complete loss of power occur. When a program is indicated in back up program box 330C, a copy of the program and associated schedule data is copied to the flash memory portion of memory 22 and named "back-up".

Figure 5D:
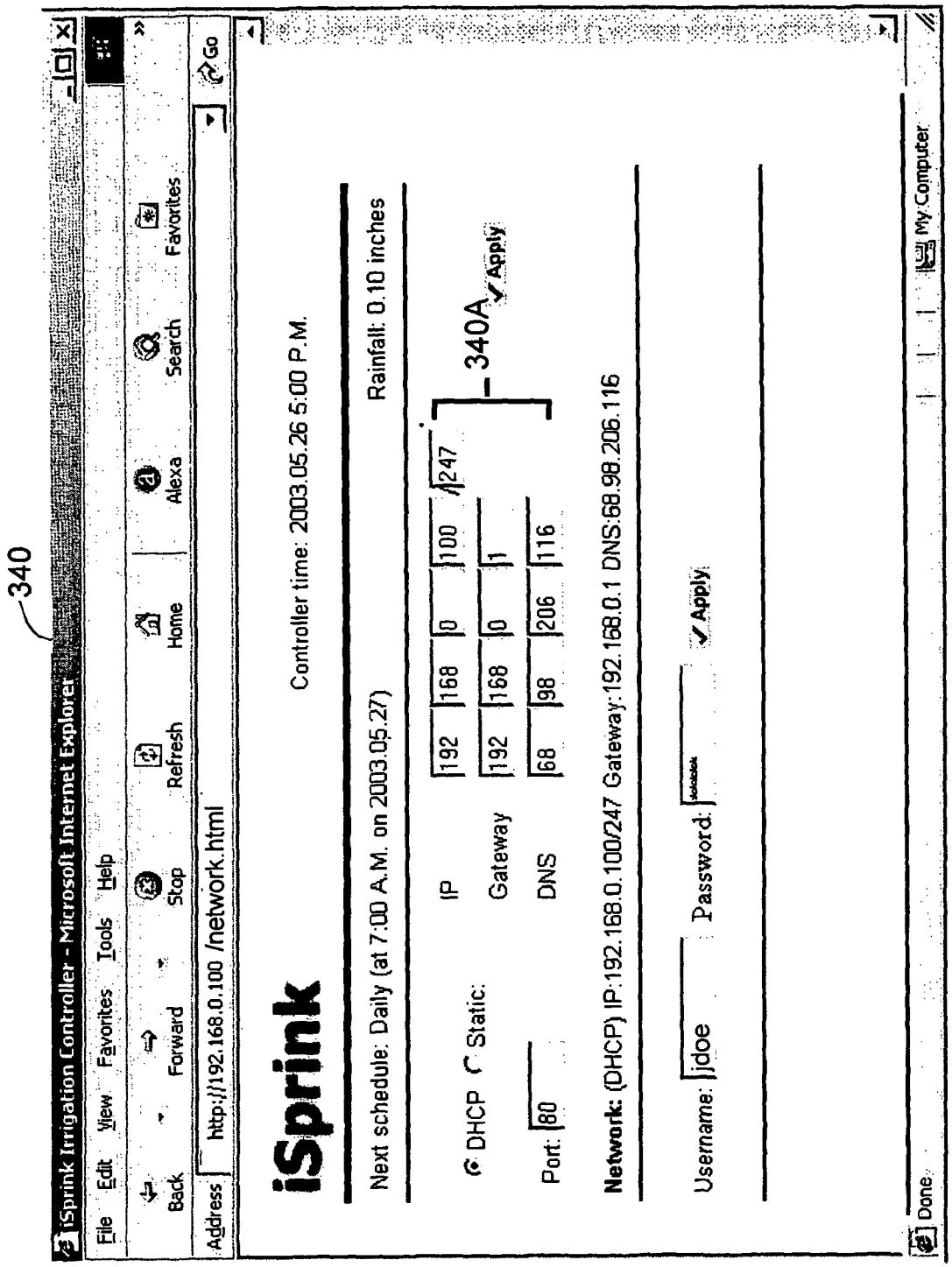
FIG. 5D is an example Network form of the embedded Web server.

Network settings page 340 is illustrated in FIG. 5D. This page is used to set or reset network settings. Network settings are entered in a network settings field 340A. As can be seen in FIG. 5D, the embedded Web server is adapted for using static or dynamic IP addresses. Irrigation controller 10 is initially given a default user name and password which may be changed by the user when the user first accesses the embedded Web server to the desired user name and password.

Figure 6:
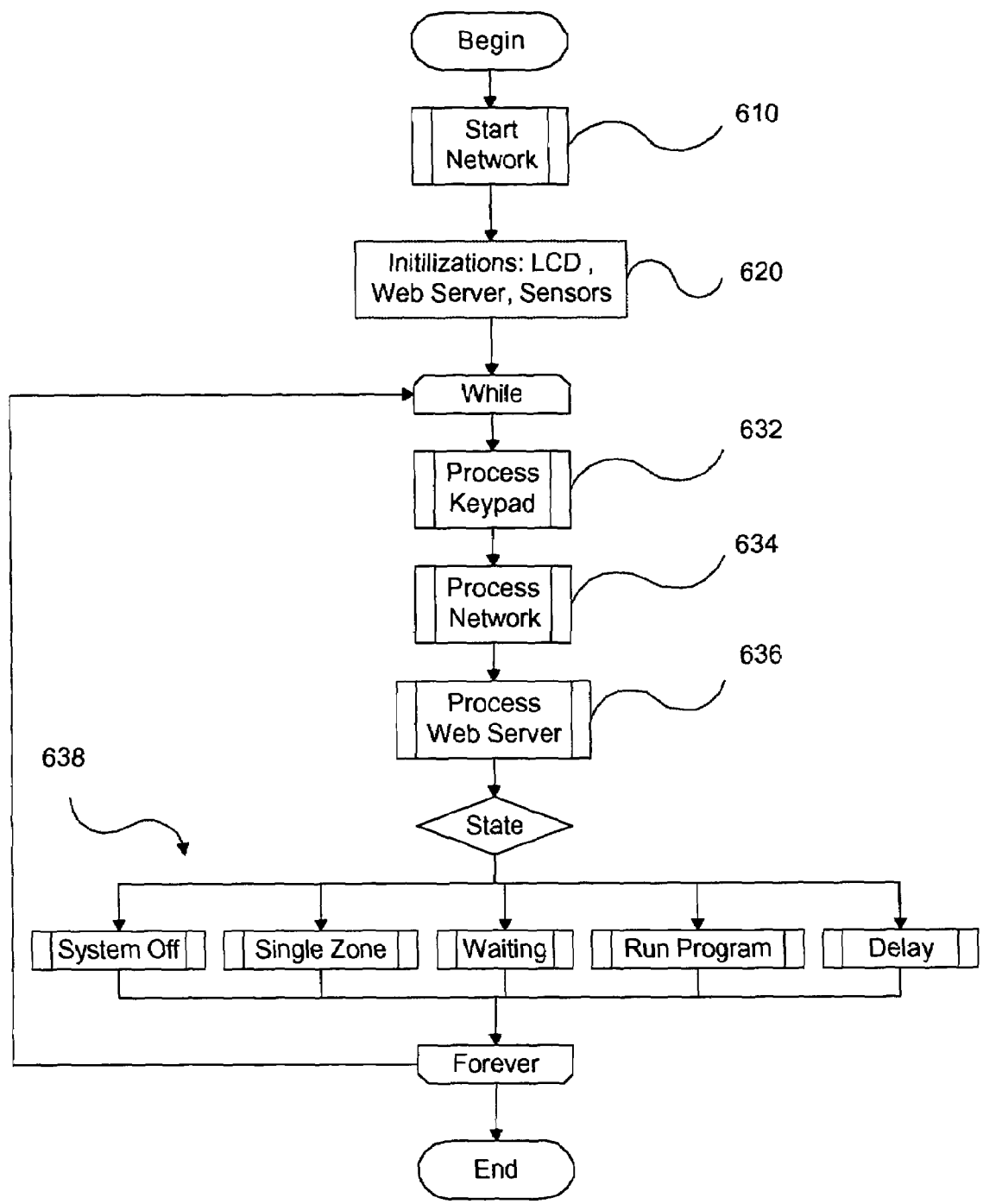
FIG. 6 is a flow chart for the program processes for the microprocessor of the irrigation controller.

FIG. 6 illustrates the processes performed by microprocessor 20 of irrigation controller 10. The processes include a start network process 610, an initialization process 620, a keypad process 632, a network process 634, a web server process 636 and a system state process 638. Keypad process 632, network process 634, web server process 636 and system state process 638 are all repetitively executed within in an endless loop. In start network process 610, communication through Ethernet chipset 30 (shown in FIG. 2) is initialized. IP settings are initialized and verified. Similarly, in initialization process 620, the operations of LCD 18, the embedded Web server and sensors 50 and 60 are initialized. Within the endless loop, microprocessor 20 checks for inputs from keypad 19 in keypad process 632, checks for inputs from LAN 80 in process 634, processes inputs and outputs to and from HTML formats in Web server process 636 and determines the system state in system state process 638. Microprocessor 20 determines the system state in a number of ways. A "system off" state would be indicated by a negative entry, most likely a Boolean 0, present in the system switch field associated with system switch block 310B of home page 310. A Delay state would occur when a "system off" state had been chosen in system switch block 3101B along with a delay time. Usually, a "system off" state would not be registered. A single zone state would also be initiated at home page 310 by manually activating a zone in run zone block 310D. This too would be a rare event. Generally, irrigation system 10 would either be waiting or running an irrigation program in accordance with the program and schedule data.

Figure 7:
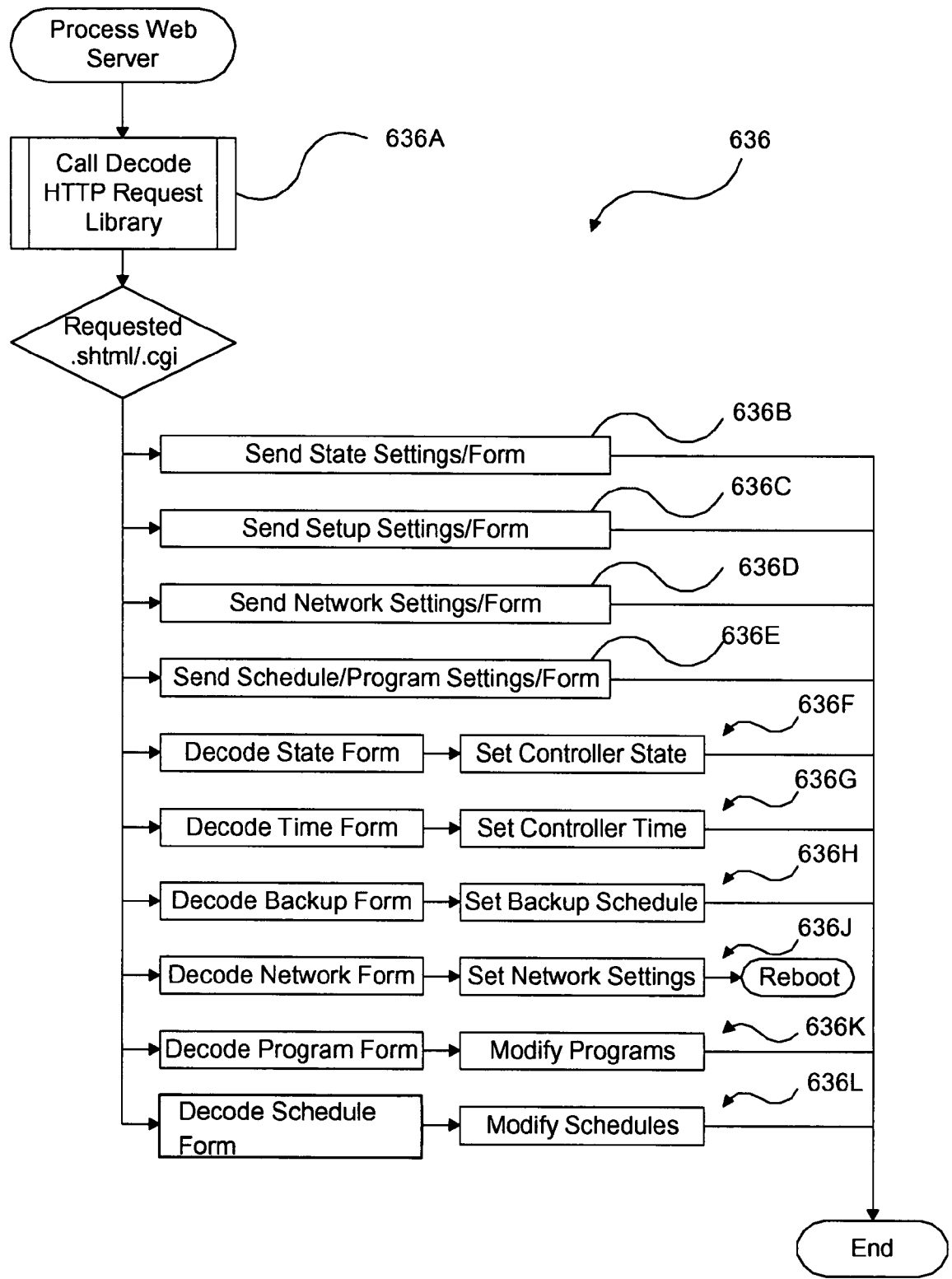
FIG. 7 is a flow chart for the embedded Web server.

Web server process 636 detailed in FIG. 7 is a process or set of steps that comprise the embedded Web server of irrigation controller 10. The processing of inputs and outputs to and from the embedded Web server in process Web server process 636 is further diagrammed in FIG. 7. As can be seen in FIG. 7, requests and inputs from LAN 80 are decoded in step 636A. The embedded Web server or Web server process 636 responds either by sending a requested page to LAN 80 in steps 636B–636E or by decoding a received form. In steps 636F–636L, Web server process 636 decodes forms and stores or modifies data in accordance with the information sent by the form. As can be seen in step 636J, a modification of network settings would return the system to start network step 610 of FIG. 6.

As can be seen in the forgoing description, irrigation controller 10 can perform the functions of controlling the operations of an irrigation system in accordance with predetermined programs and schedules and is also capable of communicating with Web accessing devices. Irrigation controller 10 can communicate with Web accessing devices because it includes an embedded Web server and an on-board Ethernet chipset for communication using standard protocols over a communications network such as a LAN or the Internet. Because of this, a web accessing device capable of communicating using HTML formats, such as a Web accessing device that supports a standard Web browser may be used to interactively access irrigation controller 10. Accordingly, unique or specialized hardware or software is not needed to interact with irrigation controller 10.

While only certain features of the invention have been illustrated and described herein, many modifications and changes will occur to those skilled in the art. It is, therefore, to be understood that the appended claims are intended to cover all such modifications and changes as fall within the spirit of the invention.

The invention claimed is:

1. In combination with an irrigation system having system components including a water supply and at least one valve for selectively directing water to at least one irrigation device in at least one irrigation zone, an irrigation controller comprising:
   (a) a microprocessor and a memory for storing irrigation program data and schedule data corresponding to the time and duration of the flow of water to said at least one irrigation zone, said microprocessor for producing control signals, said microprocessor and said memory including an embedded Web server for communicating said irrigation program data and schedule data to and from HTML formats,
   (b) at least one relay in communication with said microprocessor, said relay adapted for receiving said control signals from said microprocessor and for switching electrical currents to said at least one valve in response to said control signals for activation of said at least one valve, whereby said water supply and said at least one valve for selectively directing water to said at least one irrigation device may be selectively activated or deactivated,
   (c) an on-board Ethernet chipset for connecting said microprocessor to a LAN, whereby a network accessing device having a Web browser connected to said LAN may be used to interactively access said embedded Web server of said irrigation controller for viewing and changing of said irrigation program and schedule data, and,
   (d) at least one weather sensor connected to said microprocessor and said memory storing weather data from said at least one weather sensor so that said network accessing device may be used to view said weather data said at least one weather sensor including a rain detector which produces a stop signal when rain is detected and wherein said microprocessor is programmed to stop the operation of said irrigation system when receiving said stop signal.

2. The irrigation controller of claim 1, further comprising; a network accessing device connected to said LAN programmed to automatically access said program data and said weather data and change said program data in response to changes in said weather data.

3. The irrigation controller of claim 1, wherein, said LAN is also connected to the Internet such that a network accessing device connected to the Internet and having a Web browser may be used to interactively access said embedded Web server of said irrigation controller for viewing and changing of said irrigation program and schedule data.

4. The irrigation controller of claim 1, wherein, said LAN is also connected to the Internet and said irrigation control system further comprises a server adapted for communication using HTML connected to the Internet for interactively accessing said embedded Web server of said irrigation controller to automatically adjust said program data and said schedule data in response to changes in said weather data.

5. The irrigation controller of claim 1, wherein, said at least one relay is a triac.

6. The irrigation controller of claim 1, further comprising: a server adapted for communication using HTML connected to said Internet and accessible by said microprocessor via said LAN, said server receiving and storing weather data from said at least one sensor connected to said microprocessor and maintaining additional weather data, said server programmed to compare said weather data and said additional weather data against standard seasonal weather conditions and then modify said program data of said irrigation controller in response to variance of said weather data and said additional weather data from standard seasonal weather conditions.

7. In combination with an irrigation system having system components including a water supply at least one valve for selectively directing water to at least one irrigation device in at least one irrigation zone, an irrigation controller comprising:
(a) a microprocessor and a memory for storing irrigation program data and schedule data corresponding to the time and duration of the flow of water to said at least one irrigation zone, said microprocessor for producing control signals, said microprocessor and said memory including an embedded Web server for communicating said irrigation program data and schedule data to and from HTML formats,
(b) at least one relay in communication with said microprocessor, said relay adapted for receiving said control signals from said microprocessor and for switching electrical currents to said at least one valve in response to said control signals for activation of said at least one valve, whereby said water supply and said at least one valve for selectively directing water to said at least one irrigation device may be selectively activated or deactivated,
(c) an on-board Ethernet chipset for connecting said microprocessor to a LAN, whereby a network accessing device having a Web browser connected to said LAN may be used to interactively access said embedded Web server of said irrigation controller for viewing and changing of said irrigation program and schedule data, and,
(d) at least one weather sensor connected to said microprocessor and said memory storing weather data from said at least one weather sensor so that said network accessing device may be used to view said weather data, the at least one weather sensor including a temperature gage which produces a stop signal when the measured temperature falls below the freezing point of water, said stop signal communicated to sad microprocessor and said microprocessor is programmed to stop the operation of said irrigation system when receiving said stop signal.

8. The irrigation controller of claim 7, wherein,
the at least one weather sensor further includes a rain detector which produces a stop signal when rain is detected, said stop signal communicated to sad microprocessor and said microprocessor is programmed to stop the operation of said irrigation system when receiving said stop signal resulting from the detection of rain.

9. The irrigation controller of claim 7, further comprising;
a network accessing device connected to said LAN programmed to automatically access said program data and said weather data and change said program data in response to changes in said weather data.

10. The irrigation controller of claim 7, wherein,
said LAN is also connected to the Internet such that a network accessing device connected to the Internet and having a Web browser may be used to interactively access said embedded Web server of said irrigation controller for viewing and changing of said irrigation program and schedule data.

11. The irrigation controller of claim 7, wherein,
said LAN is also connected to the Internet and said irrigation control system further comprises a server adapted for communication using HTML connected to the Internet for interactively accessing said embedded Web server of said irrigation controller to automatically adjust said program data and said schedule data in response to changes in said weather data.

12. The irrigation controller of claim 7, wherein,
said at least one relay is a triac.

13. The irrigation controller of claim 7, further comprising:
a server adapted for communication using HTML connected to said Internet and accessible by said microprocessor via said LAN, said server receiving and storing weather data from said at least one sensor connected to said microprocessor and maintaining additional weather data, said server programmed to compare said weather data and said additional weather data against standard seasonal weather conditions and then modify said program data of said irrigation controller in response to variance of said weather data and said additional weather data from standard seasonal weather conditions.

14. In combination with an irrigation system having system components including a water supply and at least one valve for selectively directing water to at least one irrigation device in at least one irrigation zone, an irrigation controller comprising:
(a) a microprocessor and a memory for storing irrigation program data and schedule data corresponding to the time and duration of the flow of water to said at least one irrigation zone, said microprocessor for producing control signals, said microprocessor and said memory including an embedded Web server for communicating said irrigation program data and schedule data to and from HTML formats,
(b) at least one relay in communication with said microprocessor, said relay adapted for receiving said control signals from said microprocessor and for switching electrical currents to said at least one valve in response to said control signals for activation of said at least one valve, whereby said water supply and said at least one valve for selectively directing water to said at least one irrigation device may be selectively activated or deactivated,
(c) an on-board Ethernet chipset for connecting said microprocessor to a LAN, whereby a network accessing device having a Web browser connected to said LAN may be used to interactively access said embedded Web server of said irrigation controller for viewing and changing of said irrigation program and schedule data, and,
(d) a remote server in communication with said embedded Web server, said remote server programmed to change said irrigation program and schedule data of said embedded Web server.

15. The irrigation controller of claim 7, wherein:
(a) said remote server gathers weather data and uses said weather data for changing said irrigation program and schedule data.

* * * * *

UNITED STATES PATENT AND TRADEMARK OFFICE
CERTIFICATE OF CORRECTION

PATENT NO. : 7,123,993 B1
APPLICATION NO. : 10/650631
DATED : October 17, 2006
INVENTOR(S) : Aaron Lloyd Freeman and Michael Goerner Freeman It is certified that error appears in the above-identified patent and that said Letters Patent is hereby corrected as shown below:

Column 5, Line 63 reads:

31C, the user may select and run a program. Still further, in

SHOULD READ:

310C, the user may select and run a program. Still further, in

Signed and Sealed this

Ninth Day of January, 2007

JON W. DUDAS
*Director of the United States Patent and Trademark Office*